(12) United States Patent
Halushka

(10) Patent No.: US 9,097,909 B2
(45) Date of Patent: Aug. 4, 2015

(54) MANIPULATION DEVICE FOR NAVIGATING VIRTUAL MICROSCOPY SLIDES/DIGITAL IMAGES AND METHODS RELATED THERETO

(75) Inventor: Marc K. Halushka, Timonium, MD (US)

(73) Assignee: The Johns Hopkins University, Baltimore, MD (US)

( * ) Notice: Subject to any disclaimer, the term of this patent is extended or adjusted under 35 U.S.C. 154(b) by 301 days.

(21) Appl. No.: 12/664,701

(22) PCT Filed: Jun. 23, 2008

(86) PCT No.: PCT/US2008/007813
§ 371 (c)(1),
(2), (4) Date: Mar. 31, 2010

(87) PCT Pub. No.: WO2008/156872
PCT Pub. Date: Dec. 24, 2008

(65) Prior Publication Data
US 2010/0194681 A1 Aug. 5, 2010

Related U.S. Application Data

(60) Provisional application No. 60/936,620, filed on Jun. 21, 2007.

(51) Int. Cl.
*G09G 5/00* (2006.01)
*G02B 21/36* (2006.01)
*G02B 21/26* (2006.01)

(52) U.S. Cl.
CPC .............. *G02B 21/365* (2013.01); *G02B 21/26* (2013.01)

(58) Field of Classification Search
CPC .. G02B 21/0016; G02B 21/002; G02B 21/34; G02B 21/365; G02B 21/26; G01Q 30/025; G03B 21/132; H04N 1/00246; Y10S 977/869

USPC ................... 345/156; 359/362, 368–398, 400
See application file for complete search history.

(56) References Cited

U.S. PATENT DOCUMENTS 4,087,154 A * 5/1978 Menzel ......................... 359/396
5,552,272 A    9/1996 Bogart
(Continued)

FOREIGN PATENT DOCUMENTS

JP    8-179877 A    7/1996
JP    11345075 A    12/1999
(Continued)

OTHER PUBLICATIONS

Japanese Office Action from corresponding Japanese Patent Application No. 2010-513274, mailed on Sep. 21, 2012.
(Continued)

*Primary Examiner* — Stephen Sherman
(74) *Attorney, Agent, or Firm* — Mintz Levin Cohn Ferris Glovsky and Popeo, P.C.; Peter F. Corless; Christopher R. Cowles

(57) ABSTRACT

Featured is a manipulation device the ability to navigate virtual microscopy slides. The device includes an inverted light emitting diode (LED) reflecting light off a textured slide to a complimentary metal oxide semiconductor (CMOS) sensor that indicates the movement of the slide. The slide is freely moved by hand or traditional X-Y-mechanical stage on a raised platform akin to a slide stage. Finger touch controls are provided to zoom to higher or lower power images. The device plugs into a standard computer system by USB port running software to image a virtual microscope slide. Also featured are systems and methods related thereto.

24 Claims, 4 Drawing Sheets

(56) References Cited

U.S. PATENT DOCUMENTS

| | | | |
|---|---|---|---|
| 5,578,813 | A | 11/1996 | Allen et al. |
| 5,591,960 | A | 1/1997 | Furukawa et al. |
| 5,644,139 | A | 7/1997 | Allen et al. |
| 5,786,804 | A | 7/1998 | Gordon |
| 6,005,681 | A | 12/1999 | Pollard |
| 6,281,882 | B1 | 8/2001 | Gordon et al. |
| 6,433,780 | B1 | 8/2002 | Gordon et al. |
| 6,974,947 | B2 | 12/2005 | Black et al. |
| 7,126,582 | B2 | 10/2006 | Osborn |
| 7,161,682 | B2 | 1/2007 | Xie et al. |
| 7,176,442 | B2 | 2/2007 | Feldmeier et al. |
| 7,324,275 | B2 * | 1/2008 | Bonaventura et al. ......... 359/393 |
| 2002/0060842 | A1 * | 5/2002 | Ogino et al. ................... 359/368 |
| 2002/0190953 | A1 | 12/2002 | Gordon et al. |
| 2003/0048426 | A1 * | 3/2003 | Bellander ........................ 353/63 |
| 2003/0210262 | A1 | 11/2003 | Gahm et al. |
| 2004/0141637 | A1 * | 7/2004 | Bacus et al. .................. 382/128 |
| 2006/0133657 | A1 * | 6/2006 | Schmid et al. ................ 382/128 |

FOREIGN PATENT DOCUMENTS

| | | |
|---|---|---|
| JP | 2002-514319 A | 5/2002 |
| JP | 2004-199540 A | 7/2004 |
| JP | 11-345075 | 12/2011 |
| WO | WO-97/48999 A1 | 12/1997 |
| WO | WO-98-39728 | 9/1998 |
| WO | WO-98/39728 A1 | 9/1998 |
| WO | WO-2004/055572 A1 | 7/2004 |

OTHER PUBLICATIONS

Extended European Search Report dated Oct. 15, 2012, from European Patent Application No. 08768732.3.

Manuscript: Critical comparison of 31 commercially available digital slide systems in pathology. Rojo MG, Garcia GB, Mateos CP, Garcia JG, Vicente MC. Int J Surg Pathol. Oct. 2006;14(4):285-305. (** Shows the Leica Smart Move apparatus, which is the only comparable apparatus on the market).

* cited by examiner

MANIPULATION DEVICE FOR NAVIGATING VIRTUAL MICROSCOPY SLIDES/DIGITAL IMAGES AND METHODS RELATED THERETO

RELATED APPLICATIONS

This application is a 35 U.S.C. §371 U.S. national entry of International Application PCT/US2008/007813 (WO 2008/156872) and claims the benefit of U.S. Provisional Application Ser. No. 60/936,620, filed Jun. 21, 2007, the teachings of which are incorporated herein by reference.

FIELD OF INVENTION

The present invention generally relates to the field of digital imagery and virtual microscopy, more particularly to the devices and systems for imaging a virtual slide and more particularly to devices for navigating the virtual slide while viewing it.

BACKGROUND OF THE INVENTION

Before virtual microscopy, doctors, researchers, students and the like, viewed or examined a sample that had been prepared using a glass slide, which included putting the slide into the microscope, getting a position to view the sample using the microscope and focusing their eyes. While this process can become relatively fast with experience, as a practical matter, because the entire slide cannot be seen by the doctor (e.g., pathologist) and the like in one viewing, it is necessary for them to remember portions of one slide while viewing a slide or slides in combination.

With the creation of virtual microscopy techniques and systems, such as those found in U.S. Pat. Nos. 6,101,265 and 6,272,235, doctors, researchers and the like can have glass slides digitized and saved, which form the basis for a virtual slide. Virtual microscopy in general concepts has generally begun to cover the acquisition, storage and imaging of microscopic digital or computer readable images. It should be understood that the virtual image is not less real than an image of an actual glass slide, notwithstanding any differences between such images due to resolution of devices of devices for digitizing the glass slide and the glass slide itself.

A comparison was made of 31 commercially available digital slide systems then were then available ["Critical comparison of 31 commercially available digital slide systems in pathology", Rojo M G, Garcia G B, Mateos C P, Garcia J G, Vicente M C. Int J Surg Pathol. 2006 October; 14(4); 285-305]. Therein it was reported that one of the problems in digital or virtual microscopic systems was that a computer mouse is not a comfortable device for pathologist to use to review the slide. Currently to view a virtual slide, one would cause the virtual slide to appear on the monitor and thereafter to use the computer mouse to grab one side of the image, drag the image over to the far side of the monitor, then unselect the image with the mouse, move the mouse back to the original side of the image, re-grab the image and drag it over to the far side of the monitor, in a repeated fashion to navigate the slide. This is a time consuming process that cannot be overcome using a traditional mouse.

The article does report of a device or controller by Leica Microsystems (SmartMove) that is supposed to provide an ergonomic manual input controller for an automated XY stage and Z focus movement for use with microsystems developed by Leica. This device is usually coupled to a computer via an interface card so that the device can be used with the standard stages and focus adapters being used. Thus, the device is not a mere replacement of the mouse. The article referred to above also indicated or suggested the need for devices to control navigation of the virtual slide and thus replace the common mouse.

It thus would be desirable to provide a new device for controlling navigating of a virtual slide and methods and systems related thereto. It would be particularly desirable to provide such a device, systems and methods that could be adapted for use with any of a number of computer devices.

SUMMARY OF THE INVENTION

The present invention features a device for manipulating and/or navigating a virtual microscope slide as well as methods related thereto. Also featured are imaging or computer systems embodying such devices and methods.

Such devices of the present invention include an optics package having a light generation means and a light detection means. Also included is a moveable member that is configured and arranged so as to cause an image appearing on a display screen (e.g., a display screen of a computer monitor) to move on one of or both of X and Y directions and a means for processing light signals detected by the light detection means and determining an amount of movement of the moveable member.

In further embodiments, the moveable member is of the approximate size of a glass slide and more particularly the size of the glass slide from which the virtual slide was made from. In yet further embodiments, such a moveable member is a glass slide that has been treated so that light from the light generation means is reflected therefrom back to the light sensor (e.g., CMOS). In yet further embodiments, the moveable member is a glass slide having a textured surface.

In yet further embodiments the optics package includes a light emitting diode (e.g., light generating means) that emits light projected by a lens through an orifice on the top of the navigating device. The average angle of Incidence is between five and twenty degrees. The illuminated area of the slide placed on top of the slide stage of the navigating device and reflected light is projected through another lens beyond an optical window to an integrated circuit and onto an array of photo detectors (e.g., light detection means). The photo transistors charge capacitors whose voltages are subsequently digitized and stored in a memory.

In yet further embodiments, such a navigating device further includes a moving means for moving the moveable member with respect to the optics package in one of or both of an X- and/or Y-direction. Such a moving means for example, can be any of a number of conventional moving stages known to those skilled in the art for imaging real slides as adapted for use in combination with the navigating device of the present invention. In more particular embodiments, the X/Y moving stage includes a fixed portion and a moving portion, where the fixed portion (e.g., supporting structure) is in fixed relation to the optics package and the moving portion is moveable with respect to the fixed portion and thus also with respect to the optics package. In further embodiment, a moveable member or slide like member, such as those described herein, is mounted to the moving stage so as to be moveable with respect to the optics package.

While the present invention is described above for use in connection with virtual slides, the present invention also is usable for navigating digital images (e.g., digital images of pictures, drawings and the like) that are to be displayed on display screens of monitors or display devices having dimensions that are smaller (in at least one direction) of the full digital image.

Also featured is a system embodying such a device, and methods for imaging and/or navigating a virtual slide otherwise embodying attributes of the navigating device of the present invention.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1A:
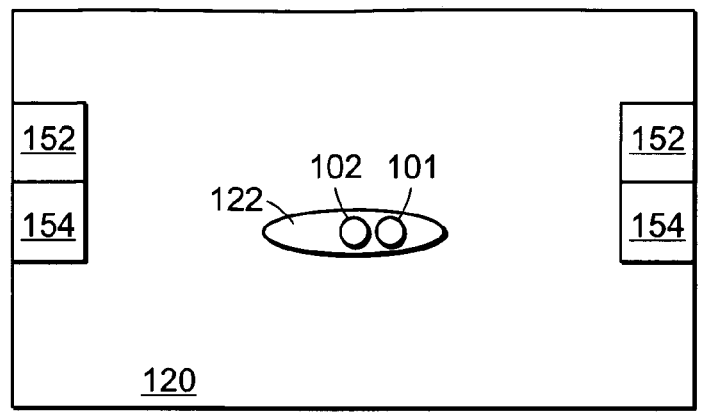
FIG. 1A is a top illustrative view of a navigating device according to the present invention.
Figure 5:
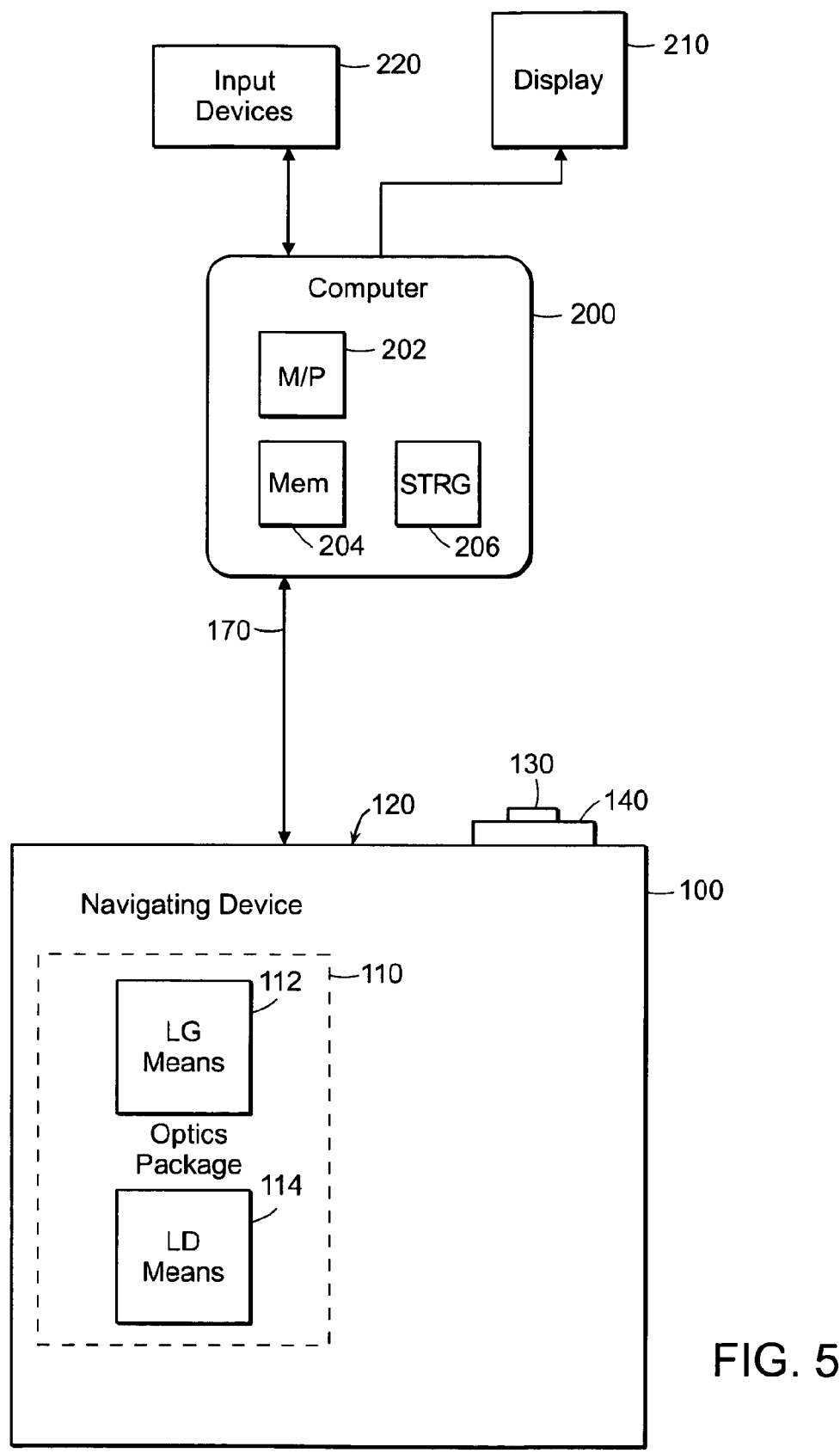
FIG. 5 is an illustrative schematic view of a computer system embodying the navigating device of the present invention.

Referring now to the various figures of the drawing wherein like reference characters refer to like parts, there is shown in FIGS. 1A, B and 2A, B, top and side views respectively of a navigating device 100, 100a according to the present invention. An illustrative schematic view of a system embodying such a navigating device 100 is shown in FIG. 5.

Such a navigating device 100 is particularly advantageous as provides an effective mechanism for navigating an image being greater than the size of a computer display screen or computer monitor 210. While the dimensions of a typical conventional glass slide are smaller than that for a screen of a computer monitor, the typically magnifications used as well as typical image enlarging for viewing leaves an image whose longitudinal axis will typically extend beyond the boundaries of a computer monitor.

In the present invention and as described herein, the image of the virtual slide on the screen of the computer monitor 210 is moved by moving a moveable member 130 (FIG. 5) (e.g., textured slide or any other material) over the optics package 110 rather than moving the apparatus over a textured surface. This will allow for infinitely larger movements around an image that is a greater size than a given computer monitor 210. This will allow a pathologist to examine his/her slide using the hand/eye coordination skills developed over a career to rapidly and completely examine slides in a virtual format. This system is to be used with current virtual microscopy imaging software.

The optics package 100 includes, inter alia, a light generating means and a light detecting means 114. The light generating means 112 is arranged so that light emanating therefrom impinges on a surface or portion 134 of the moveable member 130 that is disposed on a light stage 120 or surface of the navigating device. The light detecting means 114 is arranged so as to receive light reflected from the surface or portion 134 of the moveable member 130. In more particular embodiments, the light generating means includes a light emitting device such as a light emitting diode (LED) that is appropriate for the intended use and the light detecting means includes a complimentary metal oxide semiconductor (CMOS) 102. In the illustrated embodiment, the LED 101 and CMOS 102 are located within a small depression 122 in a light staging surface 120. In exemplary embodiments, the light staging surface or light slide staging surface 120 is a smooth solid plastic or metal akin to a conventional slide stage.

For purposes of controlling focusing (i.e., controlling the magnification level, e.g., 4×, 10×, 40×, etc), toggle buttons 152, 154 are provided on navigating device at any of a number of locations appropriate for the intended use, where one button 152 is provided for zooming in ands the other button 154 is provided for zooming out. In exemplary embodiments, the toggle buttons 152, 154 are located in the light slide staging surface 120 on opposing sides thereof.

Figure 2A:
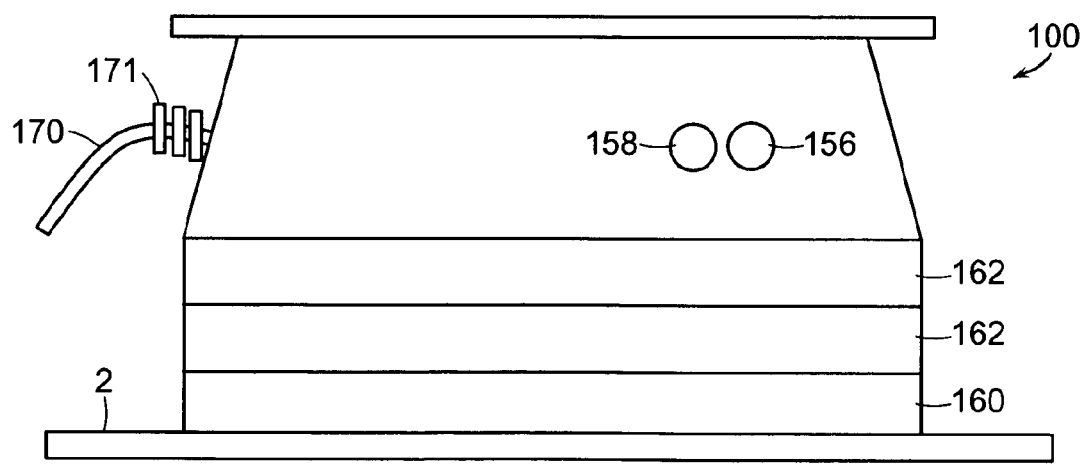
FIG. 2A is a side view of the navigating device if FIG. 1A.

As shown in FIG. 2A, in exemplary embodiments the light slide stage surface 120 is located at the top of the navigating device 100 and On and Off toggle buttons 156, 158 are provided on the sides of the navigating device. A base 160 is provided upon which the navigating device 100 can rest. In further embodiments, the base in addition to being configured to receive and hold the navigating device 100, also can be arranged so as to provide a non-slipping surface so that the navigating device 100 remains in relatively fixed relation to the surface 2 upon which the base rests when the user is using the navigating device.

In further embodiments, one or more height adjustor plates 162 are provided which can be located, for example, between the navigating device 100 and the base 160. The height adjustor plates 162 can be added for ergonomic comfort of the user.

In further embodiments, the signals generated by the navigating device and outputted to the computer 200 are provided over a USB cable 170 which can include a strain relief 171.

Figure 1B:
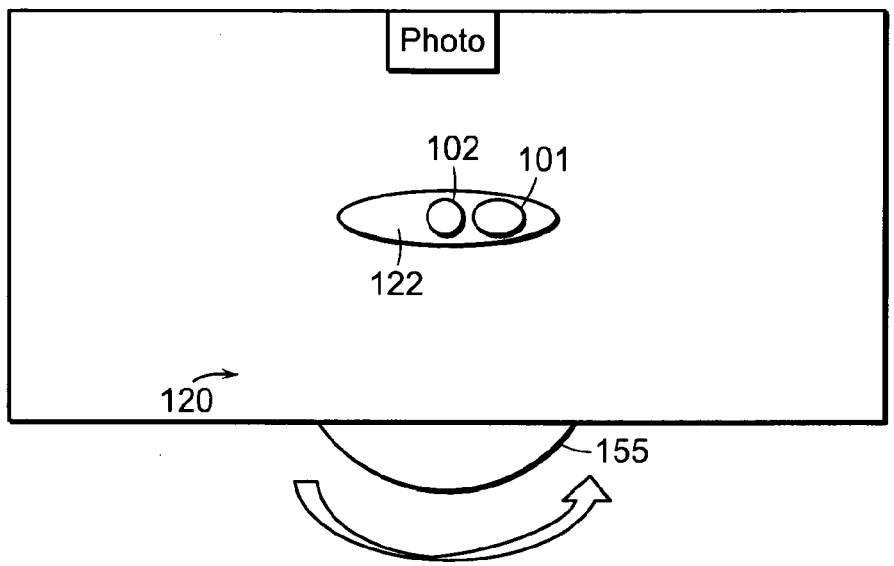
FIG. 1B is a top illustrative view of a navigating device according an embodiment of the present invention.
Figure 2B:
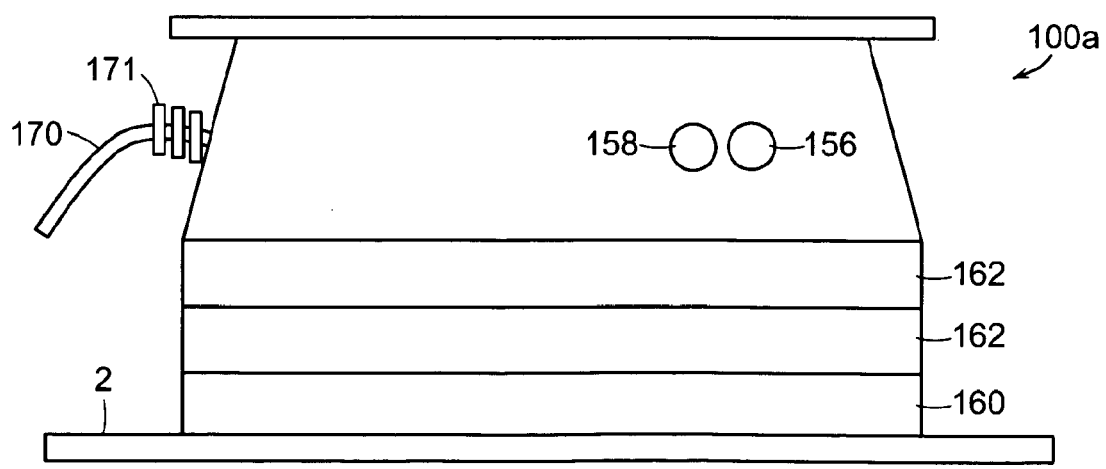
FIG. 2B is a side view of the navigating device if FIG. 1B.

Referring now to FIGS. 1B and 2B there is shown an alternative embodiment of a navigating device 100a according to the present invention. Reference shall be made to the foregoing discussion for common features not otherwise discussed in the following. In the alternative embodiment a rotating zoom wheel 155 or flywheel is provided for purposes of controlling focusing (i.e., controlling the magnification level, e.g., 4×, 10×, 40×, etc) instead of the toggle buttons 152, 154 described above. In use, the magnification level is increased by rotating the zoom wheel 155 in one direction and is decreased by rotating the zoom wheel in the other direction. In the illustrative embodiment, the zoom wheel 155 extends outwardly from a side of the navigating device 100a; however, any location that is appropriate for the intended use is contemplated and thus within the scope of the present invention.

In the present invention the LED 101 and complimentary CMOS 102 are similar in function to the LED/CMOS of a conventional optical mouse; however, in contrast to a conventional optical mouse, the system of the present invention allows movement of the moveable member 130 (e.g., textured slide or any textured material, i.e. paper, a finger, wood, etc) to navigate an image. With a conventional optical mouse, the system is arranged so as to detect movement of the mouse including movement of the LED and CMOS with respect to a fixed surface, such as for example, a mouse pad.

In the present invention, the image on the computer screen is moved by moving the moveable member over the inverted optics (LED/CMOS) instead of moving the mouse apparatus over a textured surface. This arrangement of the present invention will allow for infinitely larger movements around an image that is a greater size than a given computer monitor. This will further allow a pathologist to examine his/her slide using the hand/eye coordination skills developed over a career to rapidly and completely examine slides in a virtual format. As indicated herein, the navigating device of the present invention is to be used with current virtual microscopy imaging software.

Figure 3:
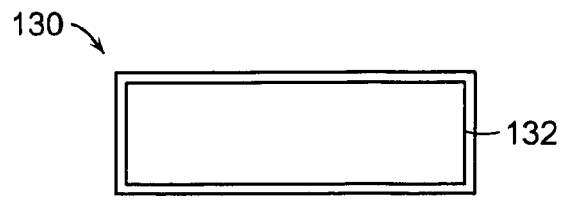
FIG. 3 is a top illustrative view of a moveable member according to the present invention.

Referring now to FIG. 3 there is shown a top illustrative view of a moveable member 130 according to the present invention. The illustrated embodiment depicts the moveable member 130 in the form of a conventional glass slide, such as those that typically measure 7.5×2.5 cm by 0.3 cm. Such a glass slide further includes a surface 132 that is treated so that the LED/CMOS system can determine movement of the treated slide and in particular embodiments, such treating includes a surface that is textured using any of a number of techniques or materials known to those skilled in the arts. In further embodiments, the moveable member 130 is configured and arranged using any of a number of materials known to those in the arts so the LED/CMOS system can determine movement of the moveable member.

In further embodiments, the navigating device 100 includes a moving means 140 that is secured to the top surface of the navigating device and which receives the moveable member 130. The movable member 130 is retained within moving means such that translation or movement of a moveable portion thereof also moves and translates the moveable member and thereby also cause a corresponding movement of the image of the virtual slide being displayed on the monitor 210. In particular embodiments, the moving means is any of a number of conventional manually operated stages or conventional computer operated stages as is known to those skilled in the art which are adapted for mounting to the navigating device and, in the case of the computer operated stages, also adapted for control by the computer 200. In an exemplary embodiments, the computer operated stages illustrated in U.S. Pat. No. 6,272,235 can be adapted for use with the present invention.

As is known to those skilled in the art, the computer 210 includes a microprocessor 202, memory 204 and storage 206 (e.g., magnetic disc, RAID enclosures, optical disks). On the storage 206 is stored operating systems, applications programs for execution on the computer and data storage including data corresponding to one or more virtual slides. Other input devices (e.g., keyboard) are connected to the computer. In addition, output devices such as printers are connected to the computers to allow user's to output information such as for example, a hard copy of a virtual slide.

Figure 4:
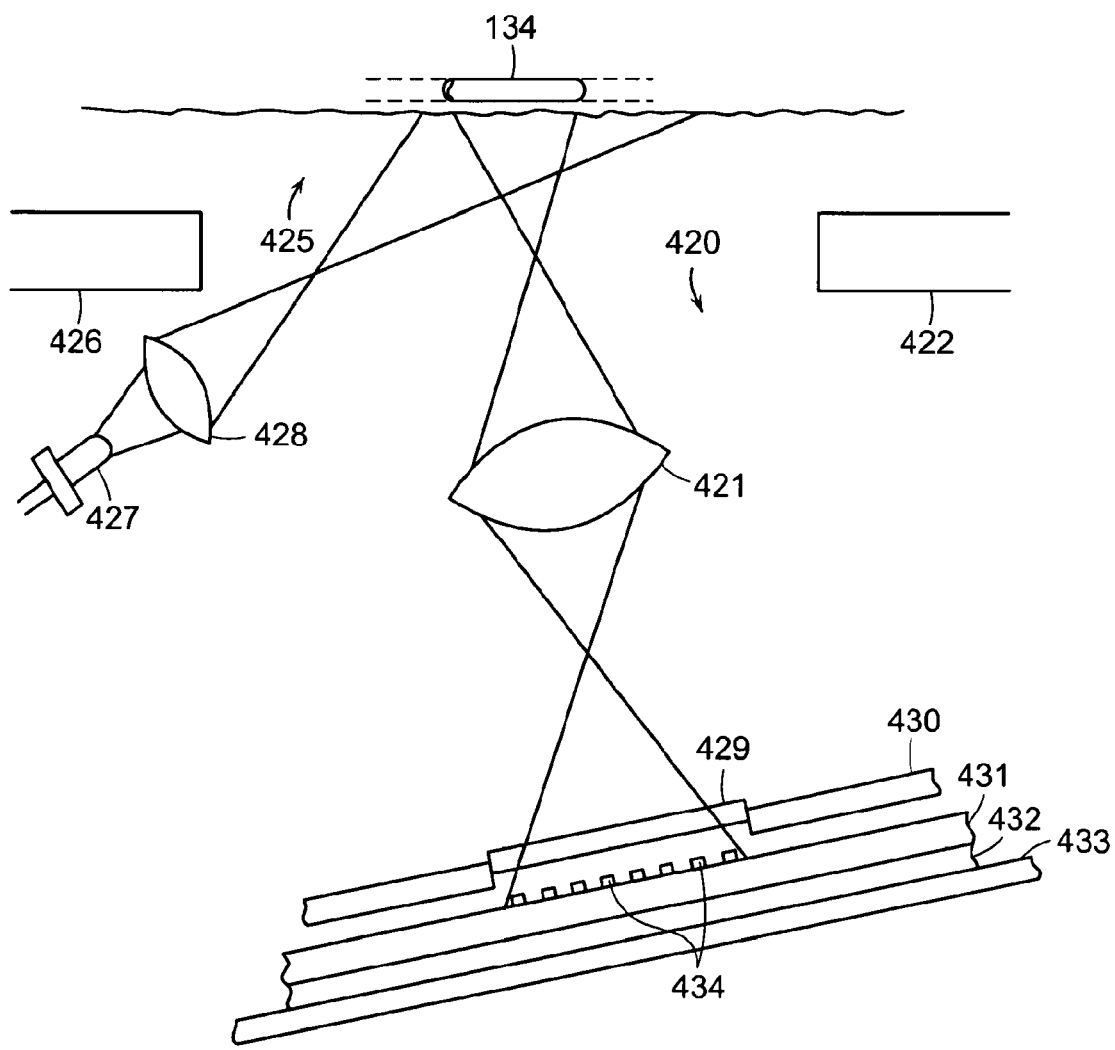
FIG. 4 is an illustrative schematic view of an optics package for use in the navigating device of the present invention.

Referring now to FIG. 4, there is shown an illustrative schematic view of an optics package 400 for use in the navigating device 100 of the present invention. In addition to presenting a schematic view, this figure also depicts the LED and CMOS interaction on the moveable member as is slides above. Reference also should be made to U.S. Pat. No. 6,433,780, the teachings of which are incorporated by reference. In the illustrated embodiment, a light emitting diode (LED) 427, emits light projected by a lens 428 through an orifice 420 on the top of the navigating device 100. The average angle of Incidence is between five and twenty degrees.

The illuminated area 132 of the moveable member 130 placed on top of the slide stage 120 is projected through a lens 421 beyond an optical window 429, to an integrated circuit and onto an array 434) of photo detectors. The optical window is held in place. The photo transistors charge capacitors whose voltages are subsequently digitized and stored in a memory. In an illustrative embodiment, the array 434 is fabricated on a portion of an Integrated circuit die 431 affixed by an adhesive 432 onto package portion 433.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A virtual slide navigating device for navigating a virtual microscopic slide on a computer display screen or monitor, the virtual microscopic slide comprising an image of a microscopic slide that has been digitized and saved, comprising:
   an optics package having a light generation means and a light detection means;
   a moveable member movable with respect to the optics package; and
   a means for processing light signals detected by the light detection means and determining an amount and direction of movement of the moveable member,
   wherein dimensions of the computer display screen or monitor are smaller in at least one direction as compared to dimensions of the image, and wherein movement of the movable member, which does not itself contain the image, causes corresponding movement of the image on the computer display screen or monitor.

2. The virtual slide navigating device of claim 1, wherein the moveable member is a size that approximates a size of a glass slide from which the virtual slide was made from.

3. The virtual slide navigating device of claim 2, wherein the moveable member is a glass slide and wherein the glass slide is treated so that light from the light generation means is reflected from the treated slide back to the light detecting means.

4. The virtual slide navigating device of claim 3, wherein the glass slide includes a textured surface.

5. The virtual slide navigating device of claim 1, wherein the light generating means comprises a LED and the light detecting means comprises an array of a plurality of photo-detectors.

6. The virtual slide navigating device of claim 1, wherein:
   the light generating means includes an LED and a lens, where light emanating from the LED is projected by the lens through an orifice on the top of the navigating device; and
   the light detecting means includes another lens, an optical window, an array of photo-detectors and capacitors, where reflected light is projected through the another lens beyond the optical window to the array of photo detectors and where photo transistors charge capacitors whose voltages are subsequently digitized and stored in a memory.

7. The virtual slide navigating device of claim 1, further comprising a moving means for moving the moveable member with respect to the optics package in one of or both of an X- and/or Y-direction and wherein the moveable member is retained within the moving means.

8. The virtual slide navigating device of claim 7, wherein the moving means is one of a manual X/Y slide moving stage or a computer operated X/Y slide moving stage.

9. The virtual slide navigating device of claim 7, wherein the moving means comprises an X/Y moving stage having a fixed portion and a moving portion, where the fixed portion is mounted in fixed relation to the optics package and the moving portion is moveable with respect to the fixed portion and thereby with respect to the optics package.

10. The virtual slide navigating device of claim 1, further including a top surface and wherein the top surface and the moveable member are configured and arranged so as to be slidable with respect to each other.

11. The virtual slide navigating device of claim 10, wherein the movable member is further configured and arranged so as to be manipulated manually so as to allow such sliding between the top surface and the moveable member.

12. The virtual slide navigating device of claim 1, wherein the full image has a longitudinal axis extending beyond boundaries of the computer display screen or monitor.

13. A method for navigating a virtual slide on a computer display screen or monitor, the virtual slide comprising an image of a microscopic slide that has been digitized and saved, comprising the steps of:
  providing a navigating device including:
    an optics package having a light generation means and a light detection means,
    a moveable member movable with respect to the optics package, and
    a means for processing light signals detected by the light detection means and determining an amount and direction of movement of the moveable member;
  moving the moveable member with respect to the optics package;
  determining an amount and direction of movement of the moveable member corresponding to said moving; and
  allowing the image on the computer display screen or monitor to move in an amount and direction corresponding to the amount and direction of movement of the moveable member, which does not itself contain the image, wherein dimensions of the computer display screen or monitor are smaller in at least one direction as compared to dimensions of the image.

14. The virtual slide navigating method of claim 13, wherein:
  the provided virtual slide navigating device further includes a moving means for moving the moveable member with respect to the optics package in one of or both of an X- and/or Y-direction and wherein the moveable member is retained within the moving means; and
  wherein said moving the moveable member further includes moving the moveable member using the moving means.

15. The virtual slide navigating method of claim 13, wherein said moving the moveable member further includes manually moving the moveable member with respect to the optics package.

16. The virtual slide navigating method of claim 13, wherein said step of providing a virtual slide navigating device further includes providing a glass slide as the movable member and treating the glass slide so that light from the light generation means is reflected from the treated slide back to the light detecting means.

17. A device for navigating digital images that are to be displayed on screens of display devices, the screens of the display devices having dimensions that are smaller in at least one direction as compared to the boundaries of a full digital image, the full digital image being a virtual microscopic slide that has been digitized and saved, said digital image navigating device, comprising:
  an optics package having a light generation means and a light detection means;
  a moveable member movable with respect to the optics package; and
  a means for processing light signals detected by the light detection means and determining an amount of movement of the moveable member,
  wherein a digital image displayed on the screen is in connection with the movable member such that the image moves in an amount and direction corresponding to the amount and direction of movement of the moveable member, which does not itself contain the image.

18. The digital image navigating device of claim 17, further comprising a moving means for moving the moveable member with respect to the optics package in one of or both of an X and/or Y-direction and wherein the moveable member is retained within the moving means.

19. The digital image navigating device of claim 17, further including a top surface and wherein the top surface and the moveable member are configured and arranged so as to be slidable with respect to each other.

20. The digital image navigating device of claim 19, wherein the movable member is further configured and arranged so as to be manipulated manually so as to allow such sliding between the top surface and the moveable member.

21. A virtual slide navigating device for navigating a virtual microscopic slide on a computer display screen or monitor, the virtual microscopic slide being an image of a microscopic slide that has been digitized and saved, wherein the dimensions of the computer display screen or monitor are smaller in at least one direction as compared to dimensions of the image, comprising:
  a movement detection means; and
  a moveable member that navigates the virtual microscopic slide appearing on the computer display screen or monitor, the movement detection means and movable member being in communication with the image on the computer display screen or monitor such that the image on the computer display screen or monitor is caused to move an amount and direction corresponding to an amount and direction of movement of the moveable member, which does not itself contain the image.

22. A virtual slide navigating device for navigating a virtual microscopic image on a computer display screen or monitor, the dimensions of the computer display screen or monitor being smaller in at least one direction as compared to dimensions of the image, comprising:
  a movement detection means; and
  a moveable member coupled to the movement detection means and being in communication with the virtual microscopic image such that the movement detection means detects an amount and direction of movement of the movable member, which does not itself contain the virtual microscopic image, and causes corresponding movement of the virtual microscopic image.

23. A virtual slide navigating device for navigating a virtual microscopic slide on a computer display screen or monitor, the virtual microscopic slide being an image of a microscopic slide that has been digitized and saved, the dimensions of the computer display screen or monitor being smaller in at least one direction as compared to dimensions of the image, comprising:

- a movement detection means; and
- a moveable member that navigates the virtual microscopic slide appearing on a display screen to move in an amount and direction corresponding to an amount and direction of movement of the moveable member, which does not itself contain the image, as detected by the movement detection means, such that, when a user moves the moveable member, the user employs a same hand/eye coordination that the user would have used with a conventional microscope and a non-virtual slide.

24. A virtual slide navigating device for navigating a virtual microscopic slide on a computer display screen or monitor, the virtual microscopic slide being an image of a microscopic slide that has been digitized and saved, the dimensions of the computer display screen or monitor being smaller in at least one direction as compared to dimensions of the image, comprising:

- a movement detection means; and
- a moveable member that navigates the image on the computer display screen or monitor to move in one of or both of X and Y directions, wherein the moveable member is a size of a microscope glass slide, and wherein movement of the image corresponds to movement of the moveable member, which does not itself contain the image, as detected by the movement detection means.

\* \* \* \* \*